Oct. 1, 1940.   E. A. SPANGLER   2,216,328
PORTABLE DIPPING VAT
Filed Feb. 17, 1938   4 Sheets-Sheet 1
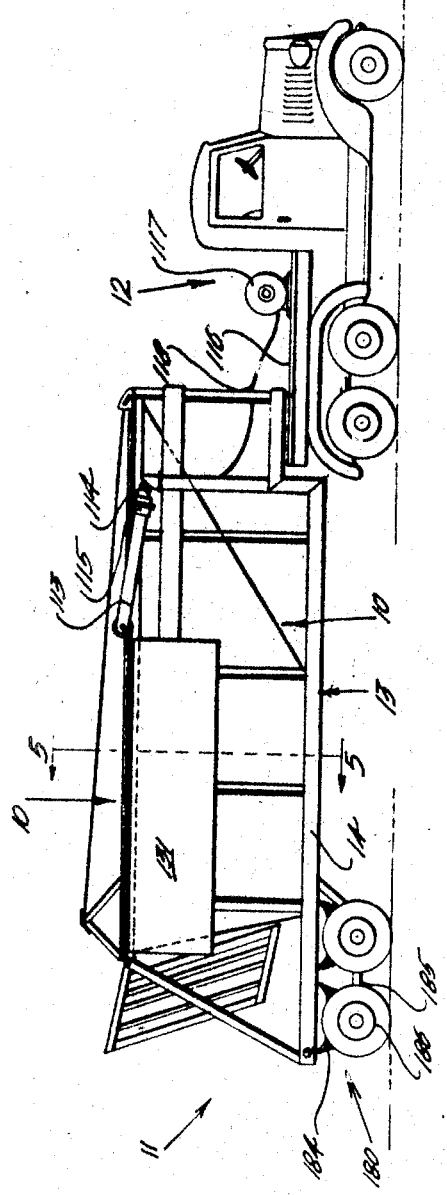
INVENTOR.
EUGENE A. SPANGLER
BY Hazard and Miller
ATTORNEY.

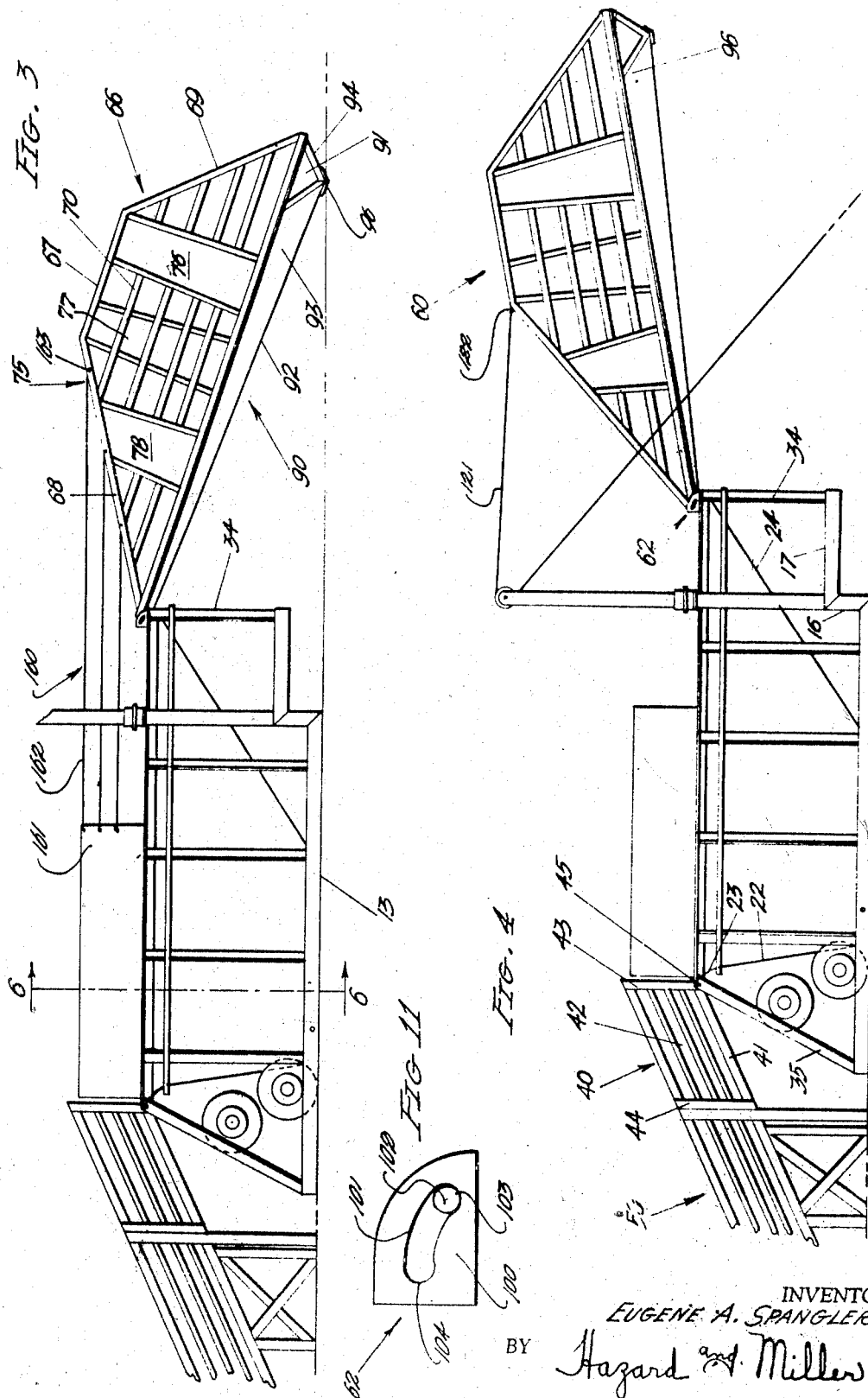

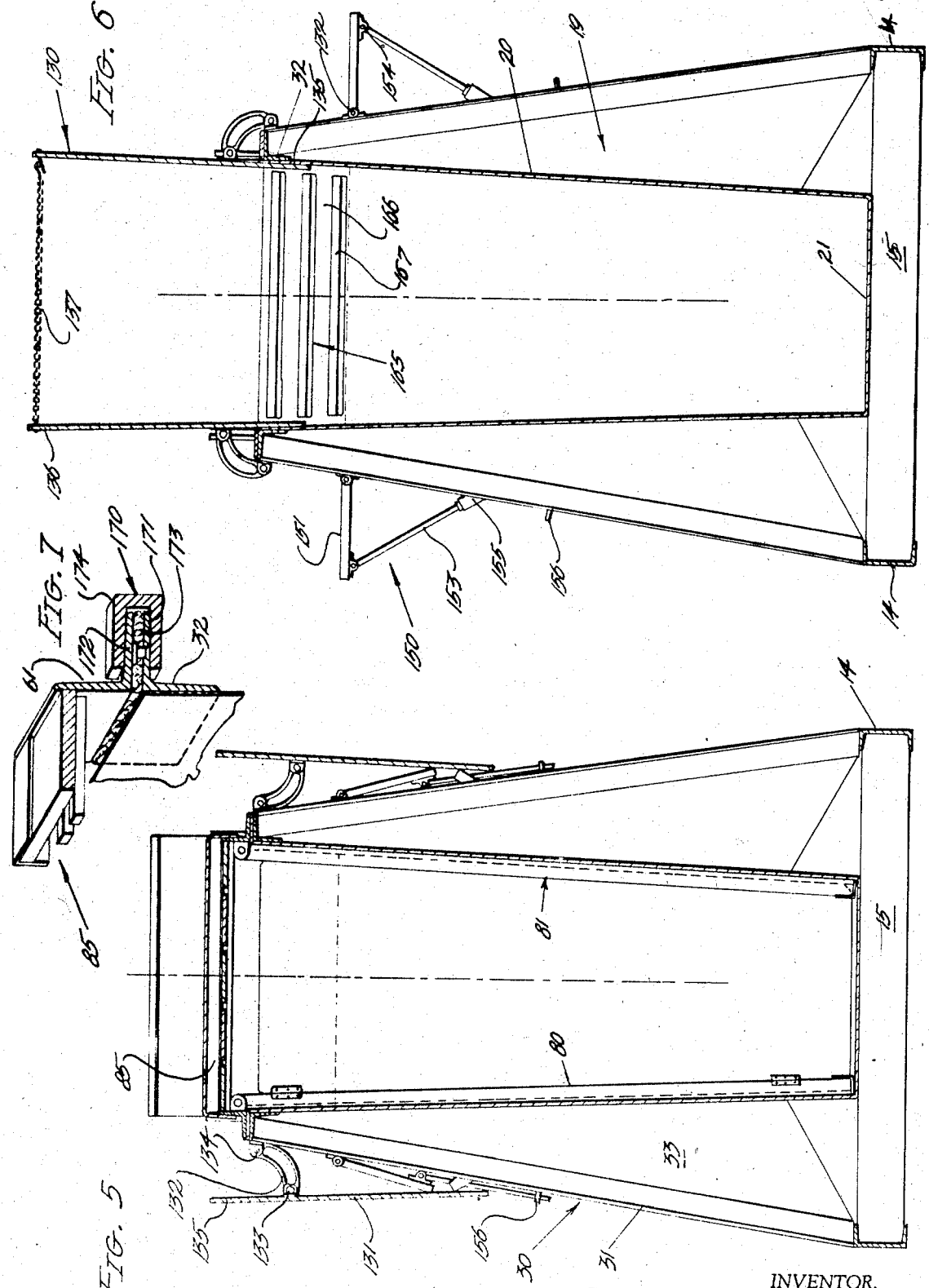

Oct. 1, 1940.  E. A. SPANGLER  2,216,328
PORTABLE DIPPING VAT
Filed Feb. 17, 1938  4 Sheets-Sheet 4
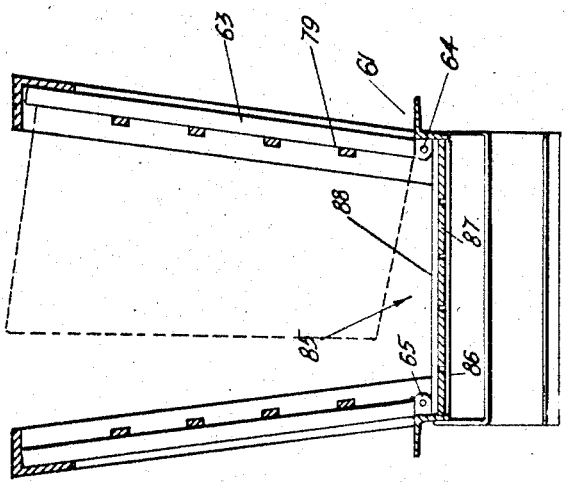
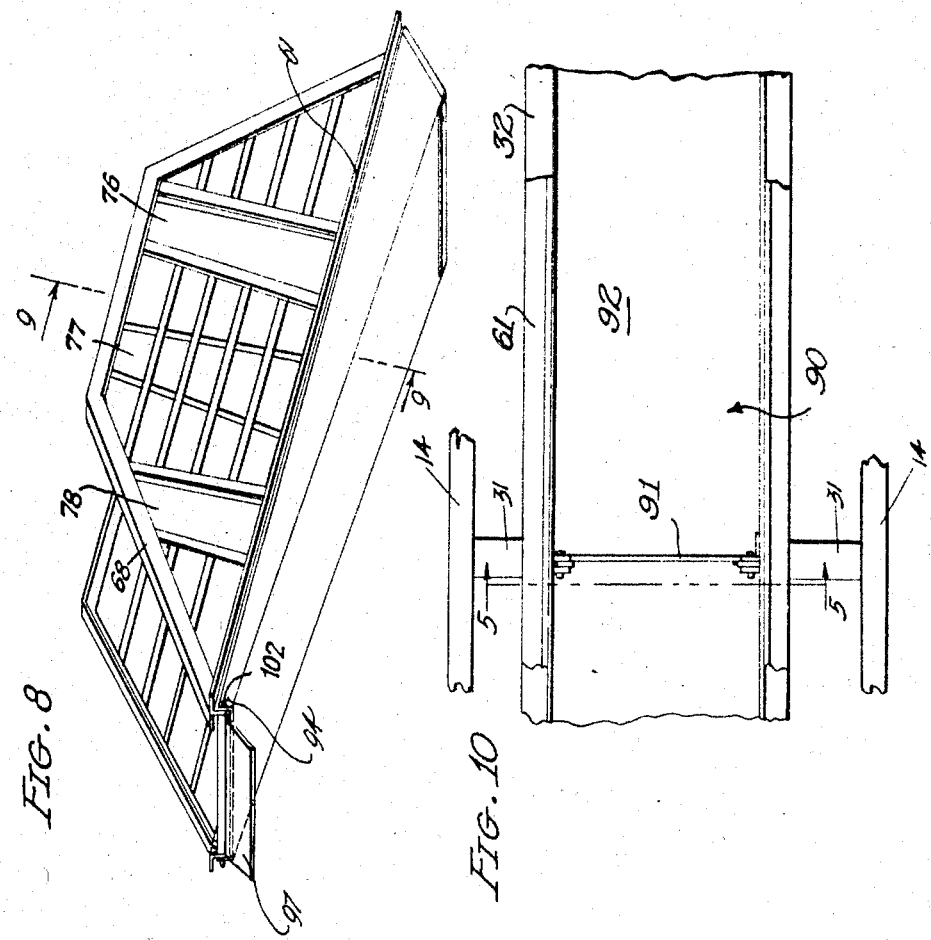
INVENTOR.
EUGENE A. SPANGLER
BY Hazard and Miller
ATTORNEY.

Patented Oct. 1, 1940

2,216,328

UNITED STATES PATENT OFFICE 2,216,328

PORTABLE DIPPING VAT

Eugene A. Spangler, Los Angeles, Calif.

Application February 17, 1938, Serial No. 191,033

20 Claims. (Cl. 119—158)

My invention relates to a portable vat for dipping cattle, sheep and other animals in water having the solution for killing ticks and other pests to which the animals are subjected. In the present practice concrete tanks are built in the ground and it is thus necessary for the cattlemen to drive their stock or to convey such stock by trucks to the dipping vat. Such an arrangement frequently requires long drives of the cattle which is detrimental to them, especially in the case of milk cows. Therefore a main object of my invention is a construction of a vat to contain the solution and to transport this from one place to another so that the vat can be brought to the live stock instead of the live stock being required to be driven or conveyed to the location of the vat.

Another main object of my invention is constructing the vat assembly on a truck which may be moved in the manner of a semi-trailer by a power truck and thus conveyed from one place to another. The inside of the vat is of the usual shape and size to comply with the specifications of the fixed concrete dipping vats so that the stock such as cattle may plunge in one end of the tank, either swim or be pulled towards the other and may walk out of the tank on an upwardly inclined ramp. In view of the fact that the tank holding the solution in order to be portable must be above the ground level, my invention also includes a partial entrance chute which may be connected to a stationary chute used for loading stock on trucks, etc., this forming a passageway for the live stock to the entrance end of the tank. I also employ in connection with the tank a run-out or discharge chute for the live stock for them to again reach the ground level after passing through the tank and upwardly in the ramp.

Another main object and feature of my invention is the retention without material loss of the chemical solution used in the animal bath as such solution is quite expensive, especially as it has to be replenished in large quantities. Therefore I provide the run-out chute with a proper chute path with drainage to a receptacle for the drippings from the stock. This receptacle thus extends preferably longitudinally of the run-out chute and has quite a large sump at the lower end for the accumulation of drip. A further feature of my invention consists of returning the drip solution caught in the receptacle and the sump by elevating the whole run-out chute on its hinge or pivot connected to the discharge end of the vat or tank, then by suitable positioning of the upper end of the receptacle the drip solution may be discharged at the ramp end of the tank.

Another characteristic and feature of my invention to prevent loss of the solution and to house the out-run chute consists of having this chute occupy a position as a cover closure for the tank during transportation and providing a series of baffles connected to the out-run chute, such baffles being located transversely to the tank when this chute forms the closure or cover. These baffles may be turned on hinges to fit adjacent the side wall framing of the discharge chute which guides the live stock to the ground. Therefore the baffles perform a dual purpose forming in effect part of a wall or fence for the discharge runway of the live stock.

Another characteristic of my invention resides in the fact that the tank is tapered in a transverse section from the top towards the bottom, as is the customary practice, the side walls of the discharge runway or chute are hinged longitudinally so that they will occupy this downward taper or converging when this chute is in its closed or inactive position and may flare outwardly to give sufficient room for the bodies of the cattle in their travel down the relatively narrow chute path of this chute. Another object and feature of my invention is the provision of splash boards hinged to the side frame supporting the tank on the truck body, these being located on opposite sides and adjacent the plunge end of the tank so that the spray and splash produced by the initial plunge of the stock is prevented from being lost in a splash over along the upper edge of the tank. In addition my invention includes a hinged walk on each side of the tank assembly which when extended forms a walk the full length of the tank for the operators in conducting the dipping of the live stock. These walks however when in transporting position hang downwardly.

Another feature of my invention in order that the discharge chute may be readily handled includes an extensible mast construction with cables and the like operated from a winch preferably on the towing truck and these cables by suitable connections operating over the mast are used to raise the discharge chute from its housed or inactive position to the active position for discharge of live stock from the ramp end of the tank. Such cable connection may also be used for discharging the solution from the drip receptacle and sump back into the tank.

Another feature of my invention as above mentioned, consists of building the vat assembly with its framing in the manner of a semi-trailer, the forward end of which may be disconnected from the towing truck, then in order that the whole tank may be lowered close to the ground, I provide a rear wheel construction which may be raised and lowered in reference to the vat framing and chassis of the semi-trailer. This allows the tank to be positioned close to the ground, resting on sills, these being formed of the bottom chassis framing of the semi-trailer, thus while the vat is in operation for dipping stock, the vat assembly is lowered considerably from its transportation position, thus lessening the heighth of the chutes at opposite ends of the tank. Also during operation the weight of the vat is removed from the wheels of the truck and at the rear end of the semi-trailer.

My invention is illustrated in connection with the accompanying drawings, in which:

Fig. 1 is a side elevation with the equipment in the transportation position in which the vat structure is illustrated as a semi-trailer supported at the front by the towing truck.

Fig. 2 is a side elevation of the semi-trailer portion showing the vat in its lowered position resting on the ground and the run-out chute partly lifted from the tank.

Fig. 3 is a view similar to Fig. 2 with both chutes in position for operating.

Fig. 4 is a side elevation similar to Fig. 3 showing the run-out chute elevated to discharge the drip back into the tank.

In Figs. 1 to 4 inclusive some of the minor details are omitted for sake of clarity.

Fig. 5 is a transverse vertical section on the line 5—5 of Fig. 1 in the direction of the arrows with the run-out chute in the housed position and forming a cover for the tank, the baffles being in operating position.

Fig. 6 is a section similar to Fig. 5 except being taken on the line 6—6 of Fig. 3 in the direction of the arrows, with the assembly in the operative position, the splash boards being elevated and the chute walks in position for dipping stock.

Fig. 7 is a detail perspective through one of the upper side beams and illustrating the clamp for the cover when in transporting position.

Fig. 8 is a perspective view of the outrun chute illustrating the drip receptacle and the movable side walls.

Fig. 9 is a transverse section on the line 9—9 of Fig. 8 in the direction of the arrows illustrating the longitudinal hinge of the stock confining sides of the outrun chute.

Fig. 10 is a plan of a section of the chute taken in the direction of the arrow 10 of Fig. 1 with the discharge chute forming a cover for the tank.

Fig. 11 is a detail side elevation of the sliding hinge connecting the tank and the outrun chute.

In the construction presented in Fig. 1 the dipping vat or tank structure 10 is shown as a semi-trailer 11 supported in part by a towing truck 12. The main characteristics of the semi-trailer include a substantial chassis or lower framing 13. This employs longitudinal channel beams 14, note particularly Fig. 5, with cross beams 15 to provide sufficient strength, an upturned forward frame member 16 forms a continuation of the side channels and a raised longitudinal channel 17 extends to the front of the frame work. This latter forms a raised bottom framing to fit over the top of the towing truck and having the bottom framing at a considerably lower elevation in order to reduce to as great an extent as possible the center of gravity of the tank with its load of dipping solution. The tank proper designated by the assembly numeral 19 has metal sides 20, note particularly Fig. 6, which converge towards the bottom, this having a floor 21, the shape in cross section is made to conform to the specifications of built-in dipping vats which are materially narrower at the bottom and sufficiently wide at the top for the bodies of the animals. The floor of the tank rests on the transverse beams 15. The entrance or plunge end 22 is steep, rising abruptly from the floor and adjacent the top has a slight convex curve 23 towards the entrance end of the tank. The discharge ramp end 24 has a more gradual slope so that the animals after engaging this ramp with their feet can readily walk up the ramp for discharge from the tank. It will be seen that the tank has substantially the same capacity of solution as the built-in tanks and that as the shape is approximately the same, the procedure of dipping stock will be much the same in my portable tank as in the stationary tanks built in the ground.

While I illustrate a certain framing structure designated generally by the numeral 30 to support and brace the tank, it will be understood that my invention is not limited to the specific arrangement shown. The drawings show a series of upright posts 31, these preferably having T cross section. They extend from the channel beams 14 at the bottom to angle capping beams 32 at the top which extend along each side of the tank and are secured to the sides adjacent the top, the vertical flanges being secured to the walls of the tank. The posts are slightly inclined inwardly as the width of the chassis at the base is considerably wider than the top of the tank. Gusset plates 33 form channels between the posts 31 and the walls of the tank, being welded to both and thus holding the tank firmly in position. At the discharge end, the upright end posts 34 extend from the forward ends of the upper side beams 17 to the forward ends of the angle beams 32 adjacent the upper end of the end ramp 24. At the entrance end, inclined posts 35 lead from the end of the side beams 14 to the angle beams 32 and thus form substantial brace members at the entrance end of the tank. If desired the beam 17 may be curved at the front in a semicircle in order to prevent obstructions of angles in the turning movement of the truck relative to the semi-trailer.

The entrance chute 40 is preferably a fixed framing having a suitable floor 41, slatted sides 42 and upper and lower end posts 43 and 44. This is pivoted or hinged to the main body of the tank by pintle pins 45. These pins preferably extend through the inclined end posts 35. This entrance chute is comparatively short and during transportation may hang in the position shown in Fig. 1, being suitably tied or bolted in position, however when the equipment is in use the chute 40 is elevated to the position shown for instance in Figs. 2, 3 and 4 and connects to a stationary or permanent chute 50. Chutes of this type are usually provided by the stock men for loading and unloading stock on or off trucks. Such equipment is usually available so that the chute 40 built on the tank assembly may readily be connected with these more or less standard designs of chutes.

The out-run chute 60 employs angle side beams 61 which extend the full length of this chute. The outer chute is connected to the tank by a hinge assembly 62, details of which are described hereunder, this permitting the chute to occupy a housed position forming a cover for the tank or to be swung on its hinge to the operating position for discharge of the live stock after their dip in the tank. The sides of the chute are formed by a plurality of side pillars 63 connected by hinges 64 having the knuckles 65 to the beam 61. These pillars are connected at the top by an upper longitudinal rail assembly 66, this including a top bar 67 substantially parallel to the floor of the chute. The inclined rail 68 between the hinge end 62 and the rail 67 is on a slope to conform to that of the out-run ramp 24. The opposite rail 69 is steeper but does not need to conform to the steep slope of the end 22 of the tank. A plurality of slats 70 connect the various rails at the top and the pillars 63, thus forming rigid side structures.

The baffle assemblies designated 75 and as illustrated, show three baffle plates indicated 76, 77 and 78, each of which is connected by a hinge 79, however where three baffles are used, it is preferable to have two of these hinged on one of the side walls of the chute and the other on the opposite side and arranged in an alternate manner. It will be noted that these baffle plates have converging side edges indicated at 80 and 81, note Fig. 5 and thus conform to the inside convergence of the side walls 21 of the tank. The purpose of having the sides of this chute hinged longitudinally is so that these may be inclined inwardly when the chute is in position for transportation forming a closure for the top of the tank and the walls may diverge outwardly as shown in Fig. 9 when being in use to give sufficient room for the bodies of the live stock. The floor of the chute 85 perferably consists of metal transverse bars 86, a series of longitudinal boards 87 with spaces between the boards and transverse cleats 88.

The drip receptacle designated by the assembly numeral 90 employs a substantial metal angle frame 91 adjacent the outer end of the run-out chute 60 and attached to the side angles 61. The metal frame and the structure of the run-out chute has a sloping bottom 92, tapering sides 93 and an end 94. The runway boards 87 being spaced apart are used as a cover and allow the drip from the stock to drain into the drip receptacle and flow into the sump 96 when the chute is in the position shown in Fig. 3. At the upper end of the drip receptacle, that is at the upper end of the out-run chute, there is preferably a flexible rubber or similar apron 97 which drapes over the ramp end 24 of the tank, covering any crack which may be formed between the end 24 of the tank and the outer chute 60.

The hinge connection 62 of the main tank to the discharge chute for the live stock is a slip type of hinge, note particularly Fig. 11. This includes a pair of knuckle plates 100 secured to the upper flange of the angle capping beams 32 on the top of the tank, there being one plate on each side. Each plate has an arcuate slot 101 in which fits the pintle pin 102, such pin being secured to the angles 61 of the chute 60. By this construction when the pintle fits the end 103 of the slot the chute may be located in the position for discharging the stock. The pintle may slip in the slot to the opposite end 104 for the purpose of tilting the chute upwardly and again lowering this to its housed position.

The hoisting assembly for the chute 60 designated by the assembly numeral 110, note particularly Figs. 1, 2 and 4, includes a mast 111, there being preferably one on each side of the tank assembly and each mast has a lower fixed bottom structure 112 and an upper folding structure 113, these being connected by a hinge joint 114 which may be of any suitable type, there being a covering sleeve 115 which when the mast is in its vertical position slides downwardly over the joint stiffening such joint. The mast preferably has a swivel head 116 with a sheave 117 mounted thereon. If desired the upper part of the mast may be secured by tie-braces to the tank structure or to anchors secured in the ground, this construction not being shown as it is common practice to apply guys to a mast construction. The towing truck 12 is illustrated as having a rear deck 116' with a winch 117' mounted thereon and a cable 118 connected to the winch.

When the vat or tank assembly 10 is lowered from the raised or towing position of Fig. 1 to rest on the ground as shown in Figs. 2, 3 and 4, the truck may be located on one side of the line of movement of the chute 60 and the winch operated with a lead 119 of the cable connecting to fastenings 120 secured adjacent the angle frame 91 at the bottom of the drip sump. The housed chute may then be raised from the position of Fig. 1 through the position of Fig. 2 until it tilts over the hinge assembly 62. Of course it will be understood that the cable will be assembled and connected with a number of return or parallel leads as is quite common practice in raising a heavy load by a cable but for sake of simplicity the cable leads have been indicated as single lines. The winch is preferably a double type of winch so that double sets of cables may be connected thereto. Therefore when the chute swings vertically over the hinge 62, the weight is taken by a lead 121, note Fig. 4, which is connected to fastenings or eyes 122 connected to the upper rails 67, preferably at their corner junction with the inclined rails 68 of the chute. The chute may then be lowered through the position shown in Fig. 4 to the work position of Fig. 3. Where the ground is soft it is preferable to dig a small excavation so that the frame 91 with the large end of the sump may be fit in the excavation, however the step down at the discharge end of the chute to the ground is readily made by live stock after dipping.

It will be understood that in the dipping operation each head of stock carries a considerable amount of the dipping solution but this readily drains off so that by the time the live stock whether cattle or smaller animals reach the lower end of the chute, most of the solution is dripped into the drip receptacle 90. If it is found that it is necessary to handle the stock through the tank rapidly and without interruption, a pump may be connected to the drip receptacle and discharge the drip back into the tank, however this drip may be returned by using the winch and raising the chute 60 from the position of Fig. 3, that is, the working position, to an inclined position of Fig. 4. In this action the chute has a slight slipping action in the slip hinge 60 assuring that none of the drip will pass between the hinge end of the chute and the discharge end of the tank, however the flexible apron 97 takes care of this.

In handling the stock it is desirable to utilize a pair of splash boards or sides designated by the assembly 130, note particularly Figs. 5 and 6. These are constructed of rectangular metal plates 131, each having knuckle arms 132 of an arcuate form connected thereto by a pintle connection 133 to the plates and 134 to the frame members of the tank, the latter being preferably connected to the sloping posts 31. By this arrangement when the tank is being towed on a highway these splash sides hang suspended on each side of the tank as shown in the cross section of Figs. 1, 2 and 5. When the tank is set up for dipping stock these sides are turned or hinged upwardly to the position of Figs. 3, 4 and 6 in which it will be noted that the edge portion 135 of the splash sides extend downwardly on the inside of the tank and fit snugly against the side walls 20 at the upper part of the tank. It is only necessary to have these splash sides extend from adjacent the plunge end 22 to a position approximately above the angle formed by the floor 21 and the discharge ramp end 42 as the splash by the cattle or other stock plunging in the tank cannot spread very far lengthwise of the tank. When the splash sides are in the working position of Fig. 6 the upper edges indicated at 136 are connected by loosely pivoted tie bars 137 or chains or cables. These cannot hinge any farther inwardly and the tie bars or cables are only necessary to prevent the splash sides from tilting outwardly.

On each side of the tank assembly there are two working platforms designated 150, note Figs. 5 and 6. Each of these has a longitudinal walk 151 which may be made of metal or a wide board construction hinged at 152 to the sides of the frame, preferably to the inclined posts 31. A series of angle braces 153 have upper pivots 154 connected to the outer edge of the walk 151. The lower ends fit in sockets 155, also secured to the post 31 and when so fitted the walks are located in a horizontal position as shown in Fig. 6 and extend substantially the full length of the tank. When the walks are lowered to the position of Fig. 5 the lower ends of the braces 153 are fitted in eyes 156 also secured to the posts 131. There is sufficient looseness in the pivotal connection 154 to allow these rod-like braces 153 to be shifted slightly to one side of the socket 155 to be fitted in the eyes 156. This retains the working platforms in their inoperative position during travel of the tank.

When the stock are being dipped a demountable fence 160 is fitted between the ends 161 of the splash boards, note Fig. 3 and the chute 60. This fence is preferably made up of a series of cables 162 with or without turn-buckles, the ends being secured in eyes or suitable fastening devices 163 preferably located in the inclined rails 68 which form the sides of the chute. Thus there is no danger of the cattle or other live stock as they walk up the ramp 24 jumping off the tank but they must follow the path down the outgoing chute 60. It will be understood that on the discharge ramp 24 there is provided a foot walk 165, this being preferably made of longitudinal boards 166 fitting snugly against the metal end 24 at the ramp and having cross cleats 167 to be engaged by the hoof of the stock illustrated above the liquid level.

One of the purposes of having the sides of the discharge chute 60 which is provided with the side pillars 63 and the rails or top bars 66, 67 and 68 hinged longitudinally of the chute is so that these may be tilted inwardly or towards each other when the chute is housed over the body of the tank. The sides are illustrated in this position in Fig. 5. The detail of forming the substantially water tight joint designated 170 on the top of the tank is illustrated in Fig. 7. As above described, the capping beams 32 extend longitudinally of the tank and similar angles extend across both ends, these thus having an outstanding flange 171. Likewise the side beams 61 of the chute also have a horizontal flange 172. Riveted to the flange 171 there is a soft water resistant gasket 173 so that the flange 172 of the chute contacts this gasket. The floor 85 of the chute is thus positioned above the upper edge of the tank and extends longitudinally thereof from end to end. The chute is made the same length as the open top of the tank. A series of U shaped clamps 174 are then fitted over the two parallel flanges 171 and 172 and tapped tightly into place by a hammer, thus having a wedging action and securely retaining the chute resting on the upper edge of the tank to prevent loss of the dipping solution due to splashing in the transfer of the tank on the highway. Moreover should any of the solution splash through the floor 85 of the chute, this is caught by the inverted metal bottom 92 of the drip pan 90.

In order to prevent surge of the solution longitudinally of the tank the three baffle plates 76, 77 and 78 are turned on their hinges to occupy a crosswise position in the tank as shown in Fig. 5. As above mentioned the side edges 80 and 81 of the baffle plates converge in accordance with the cross sectional shape of the tank and as the side walls of the chute are longitudinally hinged, these when housed also fit snugly on the inside of the tank. The baffle plates when located in the transverse position therefore develop surge baffles restricting the longitudinal surge of the solution. It will be noted that although the end rails 69 of the chute are not shaped to conform to the plunge end 22 of the tank, nevertheless the baffle 76 is positioned quite close to this end and extends to the bottom of the tank, the baffle 77 likewise extends to the bottom of the tank in close proximity to the angle formed by the floor and the inclined discharge ramp 24. The baffle 78 extends downwardly to the ramp 24. When the discharge chute 60 is in the operating position of Fig. 3 these baffles are turned on their hinges to be located parallel and fitting close in the side wall construction, being located between the side pillars 63 and the rails 66, 67 and 68 and in approximate line with the slats 70. These baffles therefore form part of the wall confining the stock as they run down the chute after dipping. On account of the baffles fitting close in alignment with the sides there is no danger of the stock becoming injured, by striking these baffle plates.

There are many ways in which the tank could be lowered from its travelling position of Fig. 1 to the operating position resting on the ground, however I illustrate for the rear end a simple carriage assembly 180. This includes a carriage frame 181 omitted in Figs. 3 and 4 having upper side beams 182 pivoted at 183 to the side beams 14 of the tank supporting framing 13. A set of springs 184 connect to a lower framing 185 on which are mounted the wheels 186. These wheels are illustrated as a double truck type and it is manifest that they may have dual wheels depending on the load or weight of the tank. A crank operated hand winch 187 indicated in Fig. 2 and omitted in Figs. 1, 3 and 4, is mounted in the lower end of the frame 13 preferably contiguous to the inclined posts 35 at the entrance end and a cable 188 extends from this winch to the outer or free end of the upper side beams 182 of the frame 181. When the side beams 182 are in alignment with the beams 14 they are held in place by locking pins or bolts 183.

Presuming it is desired to lower the tank from the travelling position of Fig. 1 to that of Fig. 2, the end connected to the truck 12 is raised by jacks to clear the truck deck or the swivel connection, however if desired the truck may be constructed to gradually lower the leading end. The bolts 184 are withdrawn and the winch 187 operated to pay out the cables 188, thus as the weight of the trailing end of the tank assembly is supported on the wheels of the carriage 180, as the cables 188 are paid out, the tank and frame assembly is gradually lowered until the rails 14 rest on the ground or on ties arranged to receive the weight of the tank. Manifestly when the tank is to be raised there is a reverse operation, the cables 188 are wound in causing the carriage assembly 180 to swing on its hinges 183, thus gradually raising the whole assembly until the carriage 180 may be locked in its transporting position of Fig. 1.

Various changes may be made in the details of the construction without departing from the spirit or scope of the invention as defined by the appended claims.

I claim:

1. In a device as described, the combination of a wheeled vehicle having a frame with a tank mounted thereon, the said frame having rear wheels and means at the front constructed and adapted to form a pivot connection to a supporting and towing truck, a tank mounted on the frame, and rear wheels having means for lowering the frame to bring the bottom of the tank adjacent the ground level, the entrance end of the tank being adapted to receive an entrance chute up which cattle may be driven into the tank, the opposite end of the tank having an inclined ramp and an outrun chute connected to the upper portion of the tank at the ramp end, the outrun chute having a hinged connection to the tank whereby such chute may be turned on the hinge and form a cover for the top of the tank.

2. In a device as described and claimed in claim 1, the outrun chute having a drip receptacle with means to catch the drip from cattle being discharged by such chute, and a hoist structure connected to the tank and to the outrun chute to tilt such chute upwardly on its hinge to discharge the drip from the receptacle back into the tank.

3. In a device as described and claimed in claim 1, the tank having side walls converging towards the bottom, the outrun chute having stock confining sides connected to the chute at each side by longitudindal hinges, and means to retain the said confining sides to guide stock on the outrun chute, the said sides being constructed and adapted to tilt inwardly to conform to the downward converging of the sides of the tank when the outrun chute forms a cover for the top of the tank.

4. In a device as described and claimed in claim 1, the tank having two opposite splash walls adjustably mounted on opposite sides constructed and adapted to be positioned adjacent the side walls of the tank when in the transporting position and to extend upwardly above the tank walls when the tank is arranged for dipping stock, the outrun chute having stock confining sides and a demountable fence connecting the splash walls and the stock confining sides of the outrun chute.

5. In a device as described, a combination of the tank mounted for transportation and having an entrance end from which stock may plunge into the tank, an inclined ramp at the opposite end and an outrun chute having a hinged connection at the upper end of the said ramp, and a mast mounted on the tank and having a cable connection to the outrun chute constructed and adapted to turn the chute on a hinge from the position for the outrun of the stock to a position above and parallel to the upper edge of the tank to form a cover therefor.

6. In a device as described and claimed in claim 5, the upper edge of the tank and the upper edge of the inclined chute having flat surfaces which when parallel are substantially horizontal, a leak-proof gasket between the edges of the tank and the chute and means to clamp the chute when in the covering position on the tank.

7. In a device as described, a semi-trailer having a chassis frame with longitudinal and transverse beams, a plurality of side posts extending upwardly from the longitudinal beams and inclined inwardly at the top, inclined end posts also extending upwardly from the ends of the longitudinal beams at one end and substantially upright end posts at the opposite end, an anglelike capping for the upper ends of the posts, a tank having downwardly converging side walls connected at their upper ends to the said cap, the tank having a floor resting on the crossbeams, one end of the tank having a steep slope at the plunge end for the live stock, the opposite end of the tank having a gradual slope ramp end constructed and adapted for live stock to walk up said end, the end of the chassis having the steep end being provided with truck wheels, the opposite end at the ramp end being constructed and adapted to have a king pin connection to a towing truck.

8. In a device as described in which a dipping tank for stock is mounted on a wheeled chassis with the wheels adapted for displacement to lower the chassis on the ground combined with a chute for stock connected to one end of the tank whereby the stock may walk the length of the chute, stock confining side walls secured to the chute, baffle plates connected to the said side walls and adapted to occupy a position substantially in alignment with said side walls when the tank and chute are in active position, the said chute when inverted being constructed and adapted to fit over the top of the tank and form a closure therefor, said baffle plates being adjustable transversely of the tank to restrain the surge of dipping solution while the tank is being transported.

9. In a device as described and claimed in claim 8, the tank having a cross sectional shape tapering from the top towards the bottom, the stock confining walls having a hinge connection to the chute whereby such side walls may be inclined inwardly in accordance with the downward taper of the tank in its cross section.

10. In a device as described and claimed in claim 8, each of the baffle plates having a hinged connection to one of the stock confining walls, whereby the baffle plates may be turned on the hinges to occupy a position in substantial alignment with the stock confining wall or transverse to the tank when the chute is inverted and thus restrain the surge of the dipping solution.

11. In a device as described a wheeled vehicle having a frame with a tank mounted thereon and such frame being adapted to be lowered whereby the weight is taken off the wheels and the frame supported on the ground surface combined with an outrun chute connected to one end of the tank having side walls adjustably connected thereon, the tank in cross section converging towards the bottom, the out run chute being adapted to fit over the top of the tank to confine the dipping solution and the sides of the said chute extending downwardly in the tank.

12. In a device as described a wheeled vehicle having a frame with a tank mounted thereon and the frame being adapted to be lowered whereby the weight is taken off the wheels and the frame supported on the ground surface combined with the tank having splash walls hinged to opposite sides thereof, said walls being adapted to be suspended on the outside of the tank during movement of the vehicle in transportation, the said splash walls having means to fit inside the upper edge of the tank and to extend above the sides of the tank to confine the splash of liquid when dipping live stock.

13. In a device as described in which a tank is mounted in a frame adapted to rest on the ground combined with an outrun chute, the outrun chute having a drip receptacle with means to catch the drip from cattle being discharged by such chute, and a hoist structure connected to the tank and to the out-run chute to tilt such chute upwardly on its hinge to discharge the drip from the receptacle back into the tank.

14. In a device as described in which a transportable tank for dipping stock is provided with an outrun chute for the stock combined with the tank having side walls converging towards the bottom, the outrun chute having stock confining sides connected to the chute at each side by longitudinal hinges, and means to retain the said confining sides to guide stock on the outrun chute, the said sides being constructed and adapted to tilt inwardly to conform to the downward converging of the sides of the tank when the outrun chute forms a cover for the top of the tank.

15. In a device as described the combination of a wheeled vehicle having a frame with a tank mounted thereon, and an outrun chute for discharge of stock after dipping combined with the tank having two opposite splash walls adjustably mounted on opposite sides constructed and adapted to be positioned adjacent the side walls of the tank when in the transporting position and to extend upwardly above the tank walls when the tank is arranged for dipping stock, the outrun chute having stock confining sides and a demountable fence connecting the splash walls and the stock confining sides of the outrun chute.

16. In a device as described, a tank mounted for transportation and having an entrance end from which stock may plunge into the tank, an inclined ramp at the opposite end and an outrun inclined chute, the combination of the tank having an upper edge and the inclined chute having a complementary upper edge, both edges providing flat surfaces which when the chute is inverted are substantially parallel and horizontal, a leak proof gasket fitted between the edges of the tank and the chute and means to clamp the chute when in the covered position relative to the tank and means to move the chute to locate such chute as a runway for live stock or as a cover for the tank.

17. In a device as described, the combination of a wheeled frame structure having a tank provided with a floor, a steep plunge end at one end of the tank, and an inclined ramp at the opposite end, the frame and tank being adapted to be lowered with the weight removed from the wheels and the frame resting on the ground, an entrance chute with a direct connection to the plunge end of the tank and an outrun chute with a hinged connection to the ramp end of the tank whereby live stock may be driven up the entrance chute, plunged into the tank at the plunge end and then walk up the ramp and down the out-run chute, a receptacle connected to the out-run chute and having means to collect the dipping solution carried from the tank by the live stock with means to return the solution from the receptacle to the tank on inclining the outrun chute upwardly by rotation on its hinge.

18. In a device as described, the combination of a wheeled frame structure having a tank provided with a floor, a steep plunge end at one end of the tank, and an inclined ramp at the opposite end, the frame and tank being adapted to be lowered with the weight removed from the wheels and the frame resting on the ground, an entrance chute with a direct connection to the plunge end of the tank and an out-run chute with a hinged connection to the ramp end of the tank whereby live stock may be driven up the entrance chute, plunged into the tank at the plunge end and then walk up the ramp and down the out-run chute, the out-run chute being inverted by its hinged connection to the tank to fit over the top of the tank and to form a closure therefor during movement of the tank by transportation on its wheels.

19. In a device as described, the combination of a wheeled vehicle having a frame with a tank mounted thereon, the frame being adapted to be lowered whereby the weight is taken off the wheels and the frame supported on the ground surface, the tank having an entrance chute hinged to one end adapted for alignment with a permanent chute for driving live stock to one end of the tank, the opposite end of the tank having an inclined ramp and an out-run chute hinged to the tank at the upper end of the said ramp whereby live stock may walk up the ramp and down the outrun chute, the out-run chute having side walls adjustably connected thereon, the tank in cross section converging towards the bottom, the out-run chute being adapted to fit over the top of the tank to confine the dipping solution and the sides of the said chute extending downwardly in the tank.

20. In a device as described, the combination of a wheeled vehicle having a frame with a tank mounted thereon, the frame being adapted to be lowered whereby the weight is taken off the wheels and the frame supported on the ground surface, the tank having an entrance chute hinged to one end adapted for alignment with a permanent chute for driving live stock to one end of the tank, the opposite end of the tank having an inclined ramp and an out-run chute hinged to the tank at the upper end of the said ramp whereby live stock may walk up the ramp and down the out-run chute, the tank having splash walls hinged to opposite sides thereof, said walls being adapted to be suspended on the outside of the tank during movement of the vehicle in transportation, the said splash walls having means to fit inside the upper edge of the tank and said splash walls extending above the sides of the tank to confine the splash of liquid when dipping live stock.

EUGENE A. SPANGLER.